United States Patent [19]

Tsukamoto et al.

[11] B 4,016,094
[45] Apr. 5, 1977

[54] ELECTRO-OPTICAL DEVICE

[75] Inventors: Masahide Tsukamoto, Neyagawa; Tetsuro Ohtsuka, Takatsuki; Kazuhisa Morimoto, Settsu; Yoshinobu Murakami, Katano, all of Japan

[73] Assignee: Matsushita Electric Industrial Co., Ltd., Japan

[22] Filed: Mar. 17, 1975

[21] Appl. No.: 559,394

[44] Published under the second Trial Voluntary Protest Program on April 20, 1976 as document No. B 559,394.

[30] Foreign Application Priority Data

June 7, 1974 Japan .............................. 49-65287
June 7, 1974 Japan .............................. 49-65288
June 10, 1974 Japan .............................. 49-66404
June 11, 1974 Japan .............................. 49-66904

[52] U.S. Cl. .............................. 252/299; 252/408; 350/160 LC; 260/143

[51] Int. Cl.[2] .............................. G02F 1/16; C09K 3/34; G02F 1/13

[58] Field of Search .............................. 252/299, 408; 350/160 LC

[56] References Cited

UNITED STATES PATENTS

| | | | |
|---|---|---|---|
| 3,650,603 | 3/1972 | Heilmeier et al. | 252/408 |
| 3,703,331 | 11/1972 | Goldmacher et al. | 252/299 |
| 3,773,747 | 11/1973 | Steinstrasser | 252/299 |
| 3,776,615 | 12/1973 | Tsukamoto et al. | 350/160 LC |
| 3,779,751 | 12/1973 | Haas et al. | 252/408 |
| 3,781,088 | 12/1973 | Tsukamoto et al. | 350/160 LC |
| 3,792,915 | 2/1974 | Oh et al. | 252/408 |
| 3,806,230 | 4/1974 | Haas | 252/299 |
| 3,819,531 | 6/1974 | Sheva et al. | 252/299 |
| 3,833,287 | 9/1974 | Taylor et al. | 350/160 LC |
| 3,891,307 | 6/1975 | Tsukamoto et al. | 350/160 LC |

FOREIGN PATENTS OR APPLICATIONS 2,026,280 12/1970 Germany .............................. 252/299
2,121,085 12/1971 Germany .............................. 252/299

OTHER PUBLICATIONS

Gray, G. W., et al., Liquid Crystals & Plastic Crystals, Vol. 1, Ellis Horwood Ltd., London, pp. 170–171 (Jan. 1974).
Gray, G. W., et al., Electronics Letters, Vol. 9, No. 26, pp. 616–617 (1973).

Primary Examiner—Benjamin R. Padgett
Assistant Examiner—T. S. Gron
Attorney, Agent, or Firm—Wenderoth, Lind & Ponack

[57] ABSTRACT

An electro-optical device using a liquid crystal consisting of 99.9 to 30 wt.% of at least one nematic liquid crystal and 0.1 to 70 wt. % of at least one optically active liquid crystal compound, (+)-p-alkoxy-p'-(2-methylbutyl)azoxybenzene. Such a device has a better display performance than similar devices because the mixture has a threshold voltage and a rapid response to an electric signal applied to the device, and so it is very practical for a matrix display device.

7 Claims, 4 Drawing Figures

ELECTRO-OPTICAL DEVICE

This invention relates to an electro-optical device which responds to application of an electric field, and more particularly to an electro-optical device using a cholesteric liquid crystal mixture which consists of at least one nematic liquid crystal and at least one optically active liquid crystal compound, and which has, when incorporated into an electro-optical device, a threshold voltage above which the transmission of the device changes and responds rapidly to an applied voltage.

Up to the present, many liquid crystal compounds have been developed for use in an electro-optical device, and some of them are now on the market. However, these liquid crystals have not been used in matrix display devices because of the disadvantage that they do not have a threshold voltage and have a slow response to an applied voltage. Generally, in a matrix display device, display elements are formed at intersections of a group of strip-shaped electrodes extending in one direction and another group of strip-shaped electrodes extending in the other direction. An image is constructed by applying electric signals to selected electrodes. One example of the structure and the driving method is described in detail, for example, in U.S. Pat. No. 3,776,615.

The matrix display devices have an advantage that the number of lead wires can be less than the number of the display elements. On the other hand, there is a problem of the cross effect which is a phenomena that about a half of the applied voltage is undesirably applied to all elements on the selected electrode except for the element at the intersection of the selected electrodes. This undesired half voltage disturbs the image. For preventing the cross effect, a special liquid crystal is required wherein the light transmission does not change until a certain voltage is applied to the liquid crystal layer between two opposed electrodes. That is, a liquid crystal material is required to have a threshold voltage when incorporated into an electro-optical device. Further, for a matrix display device, rapid response of light transmission to an applied voltage is required since an image on the matrix display device is formed by scanning the display elements rapidly.

It has been known that an electro-optical device using a nematic liquid crystal which shows a "dynamic scattering mode" has a threshold voltage. Also, it has been known that an electro-optical device which is known as "twisted nematic device" has a threshold voltage. However, these devices show only a slow response to an applied voltage. It has been known that an electro-optical device using a cholesteric liquid crystal, which is a mixture of cholesterin derivatives and nematic liquid crystal and has cholesteric-to-nematic phase transition induced by an electric field, has both a threshold voltage and a rapid response. However, since the threshold voltage varies with the change of temperature in such a device, it is difficult in the matrix display device to establish a single driving voltage which is operable over a wide temperature range. Further, it has been known that an electro-optical device using a cholesteric liquid crystal which is a mixture of a nematic liquid crystal and an optically active non-mesomorphic (non-liquid crystal) compound also has both a threshold voltage and a rapid response. However, the temperature range within which the mixture exhibits a mesomorphic (liquid crystal) state is narrow since the non-mesomorphic compound is added to the nematic liquid crystal.

Therefore, an object of the present invention is to provide an improved and novel electro-optical device.

Another object of the invention is to provide an improved electro-optical matrix display device.

A further object of the invention is to provide an electro-optical device using a cholesteric liquid crystal which has a threshold voltage and a rapid response to an applied voltage and which provides excellent results when used in matrix display devices.

These objects are attained by employing a cholesteric liquid crystal mixture which consists of 99.9 to 30 wt. % of at least one nematic liquid crystal and 0.1 to 70 wt. % of at least one optically active liquid crystal compound of (+)-p-alkoxy-p'-(2-methylbutyl) azoxybenzene which has a cholesteric mesomorphic (liquid crystal) state.

These and other objects and the features of the present invention will be apparent upon consideration of the following descriptions taken together with the accompanying drawings, wherein.

Optically active liquid crystal compounds used in this invention are (+)-p-alkoxy-p'-(2-methylbutyl) azoxybenzenes and they have the following formula;

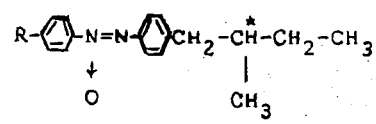

or

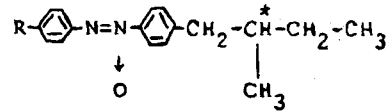

wherein R is an alkoxy radical with a carbon atoms number of 1 to 4. The sign (*) means an asymmetric carbon atom. These compounds exhibit a cholesteric mesomorphic (liquid crystal) state within respective temperature ranges as shown in Table 1.

Table 1

| R | solid or smectic → cholesteric | cholesteric → isotropic liquid |
| --- | --- | --- |
| methoxy | 41 °C | 53 °C |
| ethoxy | 4 °C | 76 °C |
| propoxy | 33 °C | 59 °C |
| butoxy | 46 °C | 73 °C |

Mixtures of a nematic liquid crystal and a compound selected from the compounds (+)-p-alkoxy-p'-(2-methylbutyl) azoxybenzene have a cholesteric liquid crystal state and have a threshold voltage when incorporated into an electro-optic device.

Nematic liquid crystal are classified into two classes. One is nematic liquid crystals the dielectric constant of which in the direction parallel to the long molecular axis is larger than that in the direction perpendicular to the long molecular axis. They are generally called nematic liquid crystals having a positive dielectric anisotropy. A designation "P-nematic liquid crystals" will be used for such nematic liquid crystals having a positive dielectric anisotropy in the following description. The other one is nematic liquid crystals the dielectric constant of which in the direction parallel to the long molecular axis is smaller than that in the direction perpendicular to the long molecular axis. They are generally called nematic liquid crystals having a negative dielectric anisotropy. A designation "n-nematic liquid crystal" is used for such nematic liquid crystals having a negative dielectric anisotropy in the following description.

Figure 1:
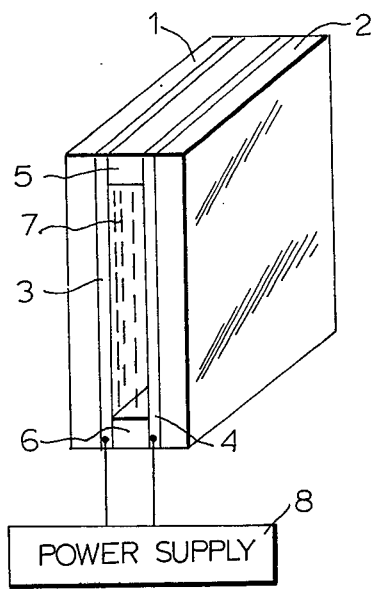
FIG. 1 is a schematic perspective view of a basic structure of an electro-optical device according to the invention.

FIG. 1 shows a basic structure of an electro-optical device of the invention which consists of a cell containing a liquid crystal and a power supply, wherein a liquid crystal layer 7 is sandwiched between two light-transparent plates 1 and 2 which are opposed to each other and having light-transparent and electrically conductive electrodes 3 and 4 on the respective inner surfaces thereof. The thickness of the liquid crystal layer or the distance between the opposed electrodes is determined by spacers 5 and 6. For the light transparent plate, glass, quartz, plastic or the like is used. The light-transparent electrode is made of $In_2O_3$, $SnO_2$, $CuI$ or the like. The spacer is plastic, glass or the like, and usually it is $5\mu$ to $100\mu$ in thickness. Power supply 8 supplies an electric voltage between the electrodes 3 and 4. Usually, it contains driver circuits, a signal generator and the like. The transmissive-type electro-optical device can be easily changed to a reflective type electro-optical device by changing the transparent electrode 3 on the plate 1 to a light-reflective electrode. Further, the electro-optical device as shown in FIG. 1 can be easily modified so as to provide a plurality of display elements by dividing the electrode on the each plate into a plurality of electrodes.

Figure 2:
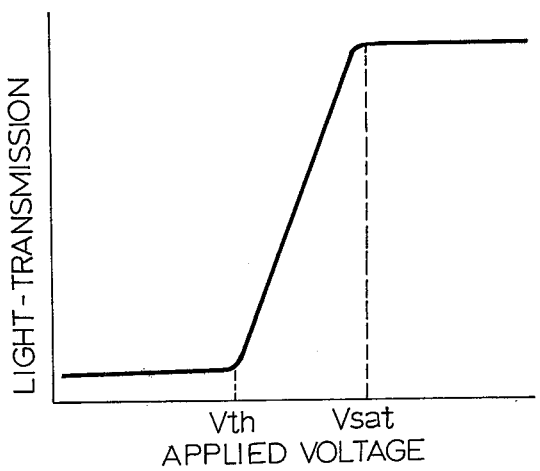
FIG. 2 is a graph showing an electro-optical property of a phase-transition-type cholesteric liquid crystal mixture for explaining the operation of the device of the invention.

The liquid crystal layer 7 of the electro-optical device shown in FIG. 1 contains a mixture of at least one p-nematic liquid crystals and at least one of the optically active liquid crystal compounds (+)-p-alkoxy-p-(2-methylbutyl) azoxybenzene, and the mixture has an electro-optical property as shown in FIG. 2. Referring to FIG. 2, light-transmission of the electro-optical device holds at a low level until an applied voltage, either DC or AC, reaches a threshold voltage Vth, and then the light transmission increases steeply as the applied voltage exceeds the threshold voltage Vth and further increases. The transmission saturates at a saturation voltage Vsat and remains at a high constant level with the voltage exceeding the saturation voltage. The abrupt change of the transmission is caused by cholesteric-to-nematic phase transition induced by an electric field. The state of the low transmission is cholesteric and the state of the high transmission is nematic. This electro-optical property exists whether the applied voltage is DC or AC. The threshold voltage varies with the change of concentration of (+)-p-alkoxy-p'-(2-methylbutyl) azoxybenzene and increases with an increase of concentration.

Representative compounds of p-nematic liquid crystals include p-alkoxybenzylidene-p'-cyanoaniline, p-cyanobenzylidene-p'-alkoxyaniline, p-alkylbenzylidene-p'-cyanoaniline, p-cyanobenzylidene-p'-alkylaniline, p-acyloxybenzylidene-p'-cyanoaniline, p-cyanobenzylidene-p'-acyloxyaniline, p-cyanophenyl-p'-alkylbenzoate, p-cyanophenyl-p'-alkoxybenzoate, p-alkylphenyl-p'-cyanobenzoate, p-alkoxyphenyl-p'-cyanobenzoate, p-alkoxybenzylidene-p'-aminobenzene, n-alkyl-p-cyanobenzylidene-p'-aminocinnamate, p-n-alkyl-p'-n-alkylazobenzene, p-n-alkyl-p'-cyanobiphenyl, and p-n-alkoxy-p'-cyanobiphenyl. As a matter of course, mixtures of a plurality of p-nematic liquid crystal compounds as described above are also p-nematic liquid crystal materials and can be employed in the present invention. Further, a mixture of p-nematic liquid crystal compound and an n-nematic liquid crystal compound which will be described later has the same properties as the p-nematic liquid crystals, and it can be also employed as a p-nematic liquid crystal in the present invention.

In order that the mixture of a p-nematic liquid crystal compound and an n-nematic liquid crystal compound have larger mean dielectric constant in the direction of alignment of the molecules, i.e. the direction parallel to the long axis of the molecules, than that in the direction perpendicular to the direction of the alignment of the molecules, the concentration of the p-nematic liquid crystal compound must be limited. For example, in the case of a mixture of p-butoxybenzylidene-p'-cyanoaniline (p-nematic) and p-methoxybenzylidene-p'-n-butylaniline (n-nematic), the concentration of p-butoxybenzylidene-p'-cyanoaniline must be more than 5 mole % in order to obtain a nematic liquid crystal having a positive dielectric anisotropy. Generally, in many cases where the optically active liquid crystal compound (+)-p-alkoxy-p'-(2-methylbutyl)-azoxybenzene is added to a mixture of p-nematic and n-nematic liquid crystal compounds, the concentration of the p-nematic liquid crystal compound is required to be more than 5 mole % in order to obtain the cholesteric-to-nematic phase transition.

EXAMPLE 1

A mixture of 70 wt. % of p-n-hexylbenzylidene-p'-cyanoaniline (p-nematic) and 30 wt. % of (+)-p-methoxy-p'-(2-methylbutyl) azoxybenzene had a cholesteric state. Light-transmission of an electro-optical device with a spacer $6\mu$ thick as shown in FIG. 1 changed abruptly as applied voltage of rectangular waveform and frequency of 250 Hz increased. The threshold voltage was 21 volts at 20°C and changed only 1.5 volts within a temperature range from 0°C to 40°C. The rise time was 50 msec when the applied voltage was 25 volts and the decay time was 6 msec, where the rise time is the time required for the cholesteric state to change to the nematic state and the decay time is the time required for the reverse process.

Electro-optical characteristics were examined for variations of the concentration of (+)-p-methoxy-p'-(2-methylbutyl)-azoxybenzene.

When the concentration of (+)-p-methoxy-p'-(2-methylbutyl) azoxybenzene was decreased to less than about 2 wt. %, the transmission of the cholesteric state increased and the abrupt change of the transmission was blurred, and so the determination of the threshold voltage became ambiguous. A device containing a mixture with a concentration of less than 2 wt. % of (+)-p-methoxy-p'-(2-methylbutyl) azoxybenzene had a rapid decay time compared with a device containing a pure p-nematic liquid crystal, so long as the concentration of (+)-p-methoxy-p-(2-methylbutyl) azoxybenzene was not less than 0.1 wt. %. A concentration more than 70 wt. % of (+)-p-methoxy-p'-(2-methylbutyl) azoxybenzene resulted in a high threshold voltage more than 70 volts which tends to cause breakdown of the electro-optical device, and so practical use becomes difficult. This tendency was also found in the other optically active liquid crystal compounds (+)-p-alkoxy-p'-(2-methylbutyl) azoxybenzene. In order to obtain excellent performance, it is preferable to use a mixture with a concentration of 2 wt. % to 70 wt. % of (+)-p-alkoxy-p'-(2-methylbutyl) azoxybenzene.

EXAMPLE 2

A mixture of 30 wt. % of p-butoxybenzylidene-p'-cyanoaniline-(p-nematic), 50 wt. % of p-methoxybenzylidene-p'-butylaniline (n-nematic) and 20 wt. % of (+)-p-ethoxy-p'-(2-methylbutyl)-azoxybenzene had a cholesteric state. The threshold voltage of an electro-optical device using a $6\mu$ thick Mylar (Trade name of E. I. duPont de Nemours & Co. Inc., U.S.A.) film as the spacer shown in FIG. 1 was 10 volts at 20°C when the applied voltage was an alternating voltage of rectangular waveform and a frequency of 250Hz. The rise time was 60 msec when 40 volts was applied and the decay time was 60 msec.

Figure 3:
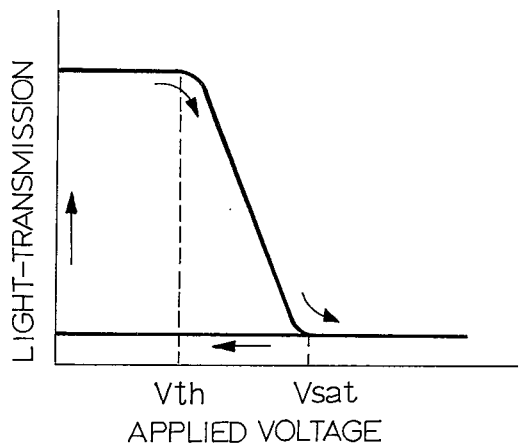
FIG. 3 is a graph showing an electro-optical property of a memory-type cholesteric liquid crystal mixture for explaining the operation of the device of the invention.

An electro-optical device containing a mixture of at least one n-nematic liquid crystal and at least one of the optically active liquid crystal compounds (+)-p-alkoxy-p'-(2-methylbutyl)-azoxybenzene had the electro-optical property as shown in FIG. 3, and it has a memory property. Referring to FIG. 3, light-transmission of the electro-optical device is high before an electric voltage is applied and holds that high level until the applied voltage, DC or AC of a frequency below a cut-off frequency, reaches a threshold voltage Vth. Further increase of the applied voltage causes the light-transmission to decrease and then to saturate at a saturation voltage Vsat. When the applied voltage is decreased from the saturation voltage V sat. the state of low transmission is kept, even if the applied voltage is removed. The low-transmission state can be turned back to the initial high-transmission state by appling a voltage at a frequency higher than the cut-off frequency. The cut-off frequency depends on the properties of the liquid crystal, such as viscosity, electric conductivity and dielectric constant, and temperature. A common value of the cut-off frequency is from about 10 Hz to a few KHz.

Representative compounds of n-nematic liquid crystal include p-alkoxy-p'-n-alkylazoxybenzene, p-n-alkyl-p'-alkoxyazoxybenzene, p-alkoxy-p'-alkoxyazoxybenzene, p-n-alkyl-p'-alkoxyazobenzene, p-alkoxy-p'-alkyl-azobenzene, p-alkoxy-p'-alkoxyazobenzene, p-alkoxybenzylidene-p'-acyloxyaniline, p-n-alkylbenzylidene-p'-acyloxyaniline, p-n-alkylbenzylidene-p'-alkoxyaniline, p-alkoxybenzylidene-p'-n-alkylaniline, p-n-alkyl-p'-acyloxyazoxybenzene.

A mixture of a plurality of n-nematic liquid crystals has the same properties as those of an n-nematic liquid crystal and it can be used in the present invention. Further, a mixture of a p-nematic liquid crystal and an n-nematic liquid crystal becomes an n-nematic liquid crystal unless the concentration of p-nematic liquid crystal exceeds a limit.

EXAMPLE 3

A mixture of 70 wt. % of p-methoxybenzylidene-p'-n-butylaniline and 30 wt. % of (+)-p-butoxy-p'-(2-methylbutyl)-azoxybenzene had a cholesteric state. The threshold voltage of the electro-optical device using a $12\mu$ thick Mylar film as a spacer as shown in FIG. 1 was 10 volts at 20°C when the applied voltage was an alternating voltage of rectangular waveform and a frequency of 125 Hz. The rise time was 10 msec when 40 volts was applied. The cut-off frequency was 1 KHz. When an alternating voltage of rectangular wave form and a frequency of 3 KHz and 75 volts was applied, the low-transmission state is changed back to the high-transmission state within an erase time of 1.5 sec.

The memory property disappeared gradually in accordance with a decrease of the concentration of (+)-p-alkoxy-p'-(2-methylbutyl)azoxybenzene, and the device tended to exhibit dynamic scattering, which is a well known phenomena for n-nematic liquid crystals.

Although an electro-optical device containing a mixture with a low concentration of (+)-p-alkoxy-p'-(2-methylbutyl)azoxybenzene did not have the memory property, the device exhibited a more abrupt change of light-transmission than that of a device containing a pure n-nematic liquid crystal, when the applied voltage increased. The effect could be obtained from a mixture with a concentration not less than 0.1 wt. % of optically active liquid crystal compounds (+)-p-alkoxy-p'-(2-methylbutyl)azoxybenzene. An electro-optic device employing a mixture with a concentration of more than 70 wt. % of (+)-p-alkoxy-p'-(2-methylbutyl)azoxybenzene had a long erase time and low light-transmission after application of an alternating voltage of a frequency above a cut-off frequency. It is preferable to use a mixture of a few wt. % to 60 wt. % of (+)-p-alkoxy-p'-(2-methylbutyl)azoxybenzene in order to obtain excellent performance.

It is apparent from the above description that a mixture of 99.9 to 30 wt. % of at least one nematic liquid crystal and 0.1 to 70 wt. % of at least one of the optically active liquid crystal compounds (+)-p-alkoxy-p'-(2-methylbutyl)azoxybenzene has some desirable electro-optical properties. In order to obtain more excellent properties, non-liquid crystal compounds can be further added to the mixture of the present invention in a limited amount as long as the mixture retains the liquid crystal state. For example, by the addition of a small amount of p-n-alkylbenzylidene-p'-n-alkylaniline, the solid-to-liquid crystal transition temperature is decreased and response to an applied voltage is made rapid. Further, for adjusting the electrical conductivity, a small amount of organic electrolyte can be added. For example, it is well known to control the electrical conductivity of a liquid crystal by adding a small amount of trimethylammoniumhalide, and the addition of this compound is also effective for the liquid crystals used in the present invention.

Figure 4:
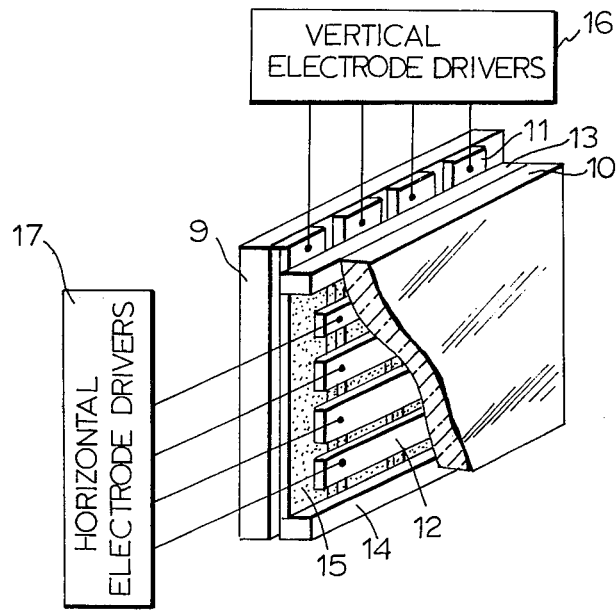
FIG. 4 is a perspective view, partially broken away, of a matrix display device according to the invention.

FIG. 4 is a perspective view, partially broken away, of a matrix display device employing the present invention, wherein the liquid crystal layer 15 is a mixture of at least one nematic liquid crystal and at least one optically active liquid crystal compound as described above, and layer 15 is sandwiched between two light-transparent plates 9 and 10 having light-transparent strip-shaped electrodes 11 and 12 on the inner surfaces thereof. The direction of the strip-shaped electrodes on one plate 9 is perpendicular to that of the strip-shaped electrodes on the other plate 10. Spacers 13 and 14 determine the thickness of the liquid crystal layer 15.

For displaying images, the vertical strip-shaped electrodes 11 on the plate 9 and the horizontal strip-shaped electrodes 12 on the plate 10 are excited by voltage signals produced by vertical electrode drivers 16 and horizontal electrode drivers 17. Various methods for application of voltage signals for displaying images are well known to those skilled in the art. Since a display element at an intersection of a vertical electrode and a horizontal electrode in the matrix display device of the present invention undergoes an abrupt change of transmission above a threshold voltage and rapid response to an applied voltage, as described hereinbefore, no cross effect, which blurs images, is produced and fact scanning can be employed so as to produce flicker-free images.

The shape of the vertical and horizontal electrodes in FIG. 4 can be changed to other shapes for changing the square shape of the display elements to other shapes. For example, the shape of the vertical and horizontal electrodes can be changed in such a manner that the intersections of the vertical and horizontal electrodes form well-known 7-segment numerals. The transmissive type matrix display device as shown in FIG. 4 can be easily modified to be a reflective type matrix display device by changing the transparent electrodes 11 on the plate 9 to light-reflective electrodes.

As described hereinbefore, the present invention provides a novel electro-optical device having a threshold voltage and rapid response. Further, a matrix display device of the present invention has a good performance.

Although the invention has been described in detail with respect to various preferred embodiments, it is not restricted to them. Modification and variation are possible which are within the spirit of the invention and the scope of the claims.

What we claim is:

1. In an electro-optical device having a cell for containing a liquid crystal and consisting of two light-transparent plates opposed to each other and having electrically conductive electrodes on the inner surfaces thereof, the electrodes on at least one inner surface being light-transparent and spacer means between said opposed electrodes; and a power supply coupled to said electrodes for applying an electric voltage to said electrodes, the improvement comprising a liquid crystal in said cell between said electrodes consisting of 99.9 to 30 wt. % of at least one nematic liquid crystal and 0.1 to 70 wt. % of at least one optically active liquid crystal compound of the formula;

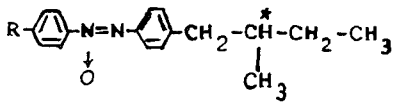

or

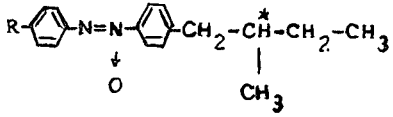

wherein R is a methoxy, ethoxy, propoxy or butoxy radical.

2. An electro-optical device as claimed in claim 1, wherein said nematic liquid crystal has a positive dielectric anisotropy.

3. An electro-optical device as claimed in claim 1, wherein said nematic liquid crystal has a negative dielectric anisotropy.

4. An electro-optical device as claimed in claim 1, wherein said electrodes on one inner surface are light reflective.

5. An electro-optical device as claimed in claim 1, wherein at least one of said plates has a plurality of light transparent strip-shaped electrodes on the surface thereof, respectively and the direction of the strip electrodes on one of said plates intersects with that of the strip electrodes on the other said plates so as to provide a plurality of display elements at the intersections.

6. An electro-optical device as claimed in claim 5, wherein said strip-shaped electrodes on one of said plates are light reflective.

7. An electro-optical device as claimed in claim 5, wherein a plurality of said display elements form 7-segment numerics.

* * * * *